Patented Aug. 14, 1951

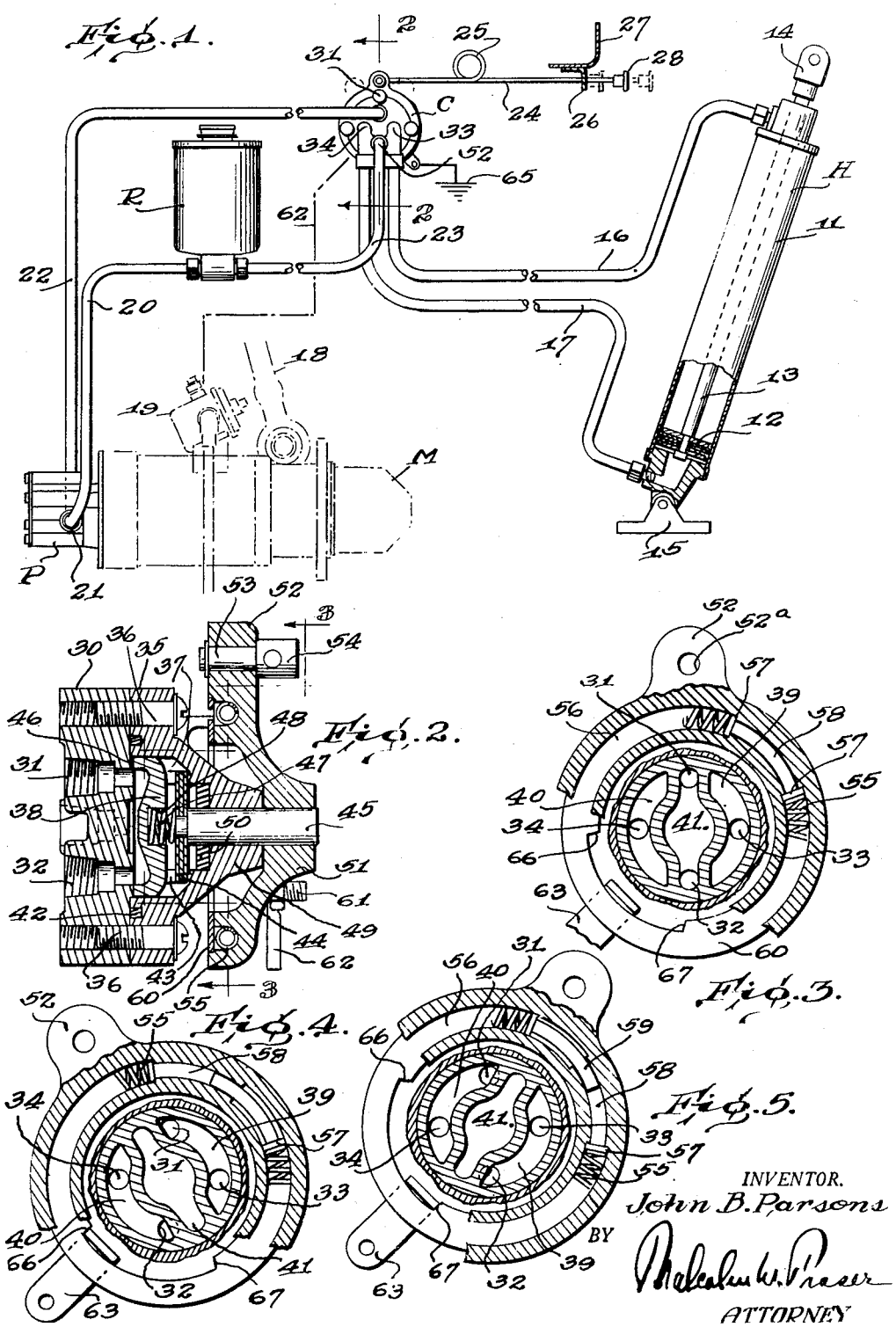

2,564,445

UNITED STATES PATENT OFFICE 2,564,445

ELECTRICALLY DRIVEN PUMP AND MOTOR HYDRAULIC SYSTEM FOR VEHICLE WINDOW REGULATION

John B. Parsons, Toledo, Ohio

Application March 25, 1946, Serial No. 656,820

7 Claims. (Cl. 60—52)

This invention relates to a hydraulic system, and particularly to a valve and switch adapted for use in connection with a hydraulic regulator mechanism having its fluid pressure generating means in connection with the automobile engine starting motor. Hydraulic regulators of the type described are used for the power actuation of the folding tops of automobiles and other vehicles of the convertible type, as well as the power actuation of other adjustable vehicle members such as seats, windows, or the like between two positions of adjustment.

It is an object of this invention to provide a hydraulic system with a pump connected to the vehicle starting motor thereby to eliminate the expense and space necessitated by a separate power unit.

Another object is to produce a new and improved control device which is adapted selectively to direct pressure fluids to one portion or another of the hydraulic regulator mechanism, or to enable the free flow of fluid to and from its pressure source.

A further object is to produce a simple and efficient control device of the type described which is durable and reliable in operation, and which is adapted to be assembled prior to installation in the hydraulic system lending itself to mass production and in which are embodied new and improved features of construction, arrangement and operation hereinafter described.

For purposes of illustration, but not of limitation, an embodiment of this invention is shown in the accompanying drawing, in which Figure 1 is a fragmentary view of the valve controlled hydraulically operated linear motor powered by means of pressure fluid from a pump directly connected to the vehicle starting motor;

Figure 2 is an enlarged longitudinal sectional view of the control device, substantially along the line 2—2 of Figure 1;

Figure 3 is a transverse sectional view substantially along the line 3—3 of Figure 2, showing the control device in its neutral or normal position;

Figure 4 is a transverse sectional view similar to Figure 3, but with a control device in the position of adjustment for directing pressure fluid to the top of the cylinder; and Figure 5 is a transverse sectional view similar to Figure 3, but with the control device in the position of adjustment for directing pressure fluid to the bottom of the cylinder assembly.

The illustrated embodiment of the invention comprises a hydraulic regulator mechanism H adapted for the adjustment of vehicle members, such as a folding top of a convertible vehicle, or a vehicle seat. As illustrated, the hydraulic regulator mechanism comprises a cylinder 11 in which is slidable longitudinally a piston 12 having a piston rod 13 adapted to be secured at its upper end to the usual collapsible top framework (not shown).

The cylinder 11 is pivotally mounted on a bracket 15 enabling swinging movement of the mechanism during operation, the piston 12 within the cylinder being forced upwardly or downwardly by pressure fluid admitted to the cylinder through appropriate tubes. A tube 16 conducts pressure fluid to the top of the cylinder, thereby to move the piston and the connected piston rod downwardly, and a tube 17 conducts pressure fluid to the bottom of the cylinder for moving the piston and piston rod in the opposite direction. The tubes 16 and 17 lead to a control device C hereinafter described.

Mounted under the hood of the vehicle is the usual electrical engine starting motor M energized in response to the depression of a lever or usual foot pedal 18, which contacts a relay switch 19. For purposes of economy, space and simplicity of construction, it is expedient to make further use of the starting motor and for that purpose a suitable hydraulic pump P is directly connected to the motor armature. The pump draws liquid from a tube 20, which is connected to the pump inlet 21 and discharges liquid under pressure through a tube 22 leading directly to a control device C. A return tube 23 leads from the outlet port of the control device and interposed between the adjacent ends of the tubes 20 and 23 is a liquid reservoir R, which insures that the tubes will at all times be supplied adequately with liquid. Since the construction and operation of the pump P forms no part of the present invention, detailed description and illustration thereof is not considered necessary.

Since the pump unit P is directly connected to the starting motor, it is evident that pumps will be operated whenever the starting motor is operated, including such times as operation for engine starting purposes. It is evident that under the latter circumstance, the flow of liquid must necessarily be handled in a manner not detrimental to the parts of the hydraulic system. For this purpose, the control device C is adapted normally to direct liquid entering through the tube 22 to the outlet tube 23 and thus back to the pump through the tube 20.

The control device is mounted under the hood of the vehicle and is operated by means of a pull rod 24 having a spring loop 25 for purposes of flexibility, the rod being slidable through a supporting bracket 26 associated with the instrument panel 27, and having at its outer end an actuating knob 28 enabling manual operation in one direction or the other as illustrated by the broken lines in Figure 1.

The control device C comprises a base 30 having screw-threaded openings 31 and 32 in which are secured the tubes 22 and 23 respectively leading from and to the pump unit P. Another pair of screw-threaded openings 33 and 34 disposed in the base 30 respectively receive tubes 16 and 17 leading to the top and bottom of the hydraulic cylinder as previously pointed out. A housing 35 is adapted to abut the inner face of the base 30 to which it is secured by means of screws 36. A substantially cup-shaped cavity 37 in the housing 35 is adapted to enclose a rotatable valve 38, which is arranged in face contact with the base 30. The face portion of the valve 38 is provided with a pair of spaced arcuate grooves 39 and 40 conforming substantially to the curvature of the valve and disposed between and separated from grooves 39 and 40 in a diametrically disposed groove 41 having an outwardly bowed central portion.

As illustrated in Figures 3, 4 and 5, the valve is adapted to interconnect the various ports for the direction of the liquid under pressure to one or the other of the previously described outlet ports leading to one end or the other of the hydraulic cylinder or the pump. As illustrated in Figure 3, in the normal intermediate position of the valve, the inlet port 31 connected to the tube 22 communicates with the central groove 41 and the outlet port 32 connected to the tube 23 also communicates with the groove 41, thereby to direct the incoming liquid into the latter passage to enable the flow of liquid back to the pump P. Manifestly, operation of the motor M when the valve is in the described normal position, merely effects the circulation of the liquid to and from the pump P. When the valve is rotated to the position illustrated in Figure 4, the inlet port 31 is in communication with the groove 39 thereby to direct liquid through the port 33 which also opens into the groove 39, and into the top of the hydraulic cylinder 11, thereby to drive the piston 12 in the downward direction. The latent fluid driven from the cylinder portion below the piston is permitted to flow through the tube 17 and into the port 34 which is in communication with the groove 40, thereby to direct the latent fluid through the communicating outlet port 32 which also communicates with the groove 40 and thus to the pump. Similarly, when the valve 38 is adjusted to the position as illustrated in Figure 5, the inlet port 31 is in communication with the port 34 thereby to direct liquid through the tube 17 to the bottom of the hydraulic cylinder driving the piston and piston rod in the upward direction, the latent fluid returning through the tube 16, port 33 and groove 39 to the outlet port 32, thereby to direct the flow of latent fluid to the reservoir and the pump unit.

It is to be understood that the housing 35 and the valve 38 are formed of insulating materials, such as Bakelite or other molded plastics. A resilient gasket 42 is disposed within an annular groove in the end portion of the cylinder housing 35 facing the base 30 for purposes of preventing the leakage of fluids therebetween. The valve member 38 is provided with bosses 43 on the outer side thereof, which bosses are securely connected to a disc member 44 operatively secured to the end portion of an operating stem 45.

The valve 38 is provided with a by-pass groove 46 associated with the pressure inlet side of the valve enabling the flow of liquid under pressure to the area on the opposite side of the valve, thereby to force the valve to seat against the face of the base 30. A coil spring 47 having one end portion seated within a socket 48 formed in the opposite side of the valve 38, and the other end bearing against the disc 44, normally urges the valve 38 against the base 30, but not with such pressure as will interfere with the desired turning movement thereof nor affect the desired liquid seal.

The housing 35 is formed with an integral boss 49 which provides a bearing for the operating stem 45, the inner portion of which is recessed to receive a packing 50 which provides a seal preventing the leakage of fluid along the stem 45.

Secured to the outer end portion of the stem 45 is a rotatable cover or cap 51 formed of an electrical insulating material. An ear 52 integral with an outer edge portion of the cap 51 is provided with an aperture 52a for the receipt of a pin 53 having a head 54. The head 54 is apertured to receive the end portion of the rod 24 previously described, enabling the cap to be oscillated to a position one side or the other of the intermediate or normal position.

The cap 51 normally is retained in the predetermined intermediate position by a coil spring 55 which is disposed in an arcuate recessed groove 56 formed on the inner side of the cap. The ends of the spring 55 are adapted to abut against discs 57 adapted to slide within the groove 56. As illustrated in Figure 3, the spaced apart ends of the arcuate groove 56 are connected by another short arcuate groove 58 of narrower cross section into which fits an arcuate post member 59 which is fixed at this lower end to the stationary housing 35. It is thus apparent that the abutment discs 57 are adapted to abut against the shoulders formed between the grooves 58 and 56 of different cross sections, thereby to space apart the end portions of the coil spring 55.

When the cap 51 is oscillated in one direction or the other, the post 59 remains stationary in relation to the grooves thereby to compress the coil spring, as illustrated in Figures 4 and 5, which urges the cap to the normal intermediate position upon release of the applied external forces. Arranged against the under side of the cap 51 is a metal conducting ring 60, which is connected to a binding post 61 having a lead 62 connected to the relay 19 associated with the motor M.

An electrical contact post 63, grounded at 65, is adapted to be engaged by an abutment 66 or 67 on the conducting ring 60 when the cap is oscillated to one or the other of the positions of adjustment. Thus, when the cap is turned to one or the other of the latter positions, the electrical contact elements are engaged enabling the passage of electrical current to the relay 19, energizing the starting motor, thereby to pump liquid to the control valve which directs same to one end or the other of the hydraulic cylinder effecting the movement of the adjustable vehicle member as desired.

It is manifest that I have produced an improved hydraulic system, which enables the use of the vehicle engine starting motor for other purposes such as the operation of the fluid pump for the generation of pressure fluids necessary for the operation of a hydraulic regulator mechanism. The improved system provides a very simple and efficient means for enabling the free movement of circulation of the pressure fluid which results from the operation of the motor for engine starting purposes. The system further provides for the energization of the starting motor in response to the adjustment of a control valve to one position or another enabling the generated pressure fluid selectively to be directed to one end or the other of the hydraulic cylinder for operation of the hydraulic mechanism to the required position of adjustment. It is evident that the common use of the starting motor for the dual purposes described, provides economies in cost and space.

Reference is hereby made to my copending application Serial No. 620,512, filed October 5, 1945, which in many respects is similar to the control device shown and described herein.

It is to be understood that numerous changes in details of construction, arrangement and operation may be effected without departing from the spirit of the invention especially as defined in the appended claims.

What I claim is:

1. In an automotive vehicle having an electrical engine starting motor and electrical circuit means closeable for actuating said motor whereby to start said engine, the improvement which comprises: a cylinder and piston assembly for imparting movement to a vehicle member between two positions of adjustment; a pump connected to be driven by said motor; first and second tubes respectively connected at one end to the inlet and discharge of the pump; third and fourth tubes respectively connected at one end to opposite ends of said cylinder; an adjustable control device to which the opposite ends of said tubes are connected, said control device being adjustable between a normal position and abnormal positions on one side and the other of said normal position; fluid connection means in said control device establishing, when said control device is in said normal position, a bypass connection between said other ends of said first and second tubes thereby establishing the free flow of pressure fluid to and from said pump, said fluid connection means selectively directing pressure fluid to one of the other ends of said third and fourth tubes when said control device is correspondingly adjusted to one or the other of said abnormal positions; and means for closing said electrical circuit means in response to movement of said control device to either of said abnormal positions.

2. The combination claimed in claim 1, said electrical circuit means including contact elements engageable for closing said circuit means, said contact elements being arranged to be engaged when said control device is adjusted to one of said abnormal positions; and means for adjusting said device to one or the other of said abnormal positions.

3. The combination claimed in claim 1, the means for adjusting said device comprising a manually operable lever.

4. In an automotive vehicle having an electrical engine starting motor and electrical circuit means closeable for actuating said motor whereby to start said engine, the improvement which comprises: a cylinder and piston assembly for imparting movement to a vehicle member between two positions of adjustment; a pump connected to be driven by said motor; fluid conduit means connected between said pump and opposite ends of said cylinder; an adjustable control device in said conduit means, said control device being adjustable between a normal position and two abnormal positions, said control device in said normal position establishing a bypass for the free flow to and from the pump, of fluid circulated by the pump; said control device including means therein for directing the flow of pressure fluid to one end or the other of said cylinder upon adjustment thereof to one or the other of said abnormal positions; and means for closing said electric circuit means in response to adjustment of said device to one of said abnormal positions, thereby to drive said pump.

5. In an automotive vehicle having an electric engine starting motor and electrical circuit means closeable for energizing said motor so as to start said engine: a pump connected to be driven by said electric motor; tube means respectively connected at one end to the inlet and discharge of the pump; an adjustable control device to which the opposite ends of said tube means are connected; said control device being adjustable between a normal intermediate position and two extreme positions; fluid connections between said control device and said fluid motor for operating the latter in one direction or the other upon adjustment of said control device to one or the other of said extreme positions; said control device, in said intermediate position, establishing a bypass connection for the free flow of fluid from and to said pump; and means for closing said electrical circuit means in response to the movement of said control device to one of said extreme positions.

6. In an automotive vehicle having an electrical engine starting motor and electrical circuit means closeable for energizing said motor so as to start said engine; a fluid motor for imparting vehicle member movements; a pump connected to be driven by said starting motor; an adjustable control device moveable between normal and abnormal positions; operative connections between said control device and said pump and said control device and said fluid motor for operating the latter in one direction or the other upon corresponding adjustment of said control device to an abnormal position; said control device in its normal position establishing a bypass between the inlet and discharge of the pump whereby to circulate fluid freely to and from the pump during operation of said starting motor for engine starting purposes; and means for closing said electrical circuit means in response to the movement of said control device from normal position to an abnormal position.

7. In an automotive vehicle having an electrical engine starting motor and electrical circuit means closeable for energizing said motor so as to start said engine; a reversible fluid motor for imparting vehicle member movements, and having an inlet and an outlet, said fluid motor having a pair of fluid connections arranged so that pressure fluid selectively input to one or the other of said connections will drive said fluid motor in one or the other direction; a pump connected to be driven by said staring motor; an adjustable control device having a chamber, an inlet port, an outlet port, and a pair of other ports; fluid conduit means respectively connecting the inlet and outlet of said pump with the outlet and inlet ports of said control device; other fluid conduit means respectively connecting the pair of other ports with the fluid connections of said fluid motor; a rotor in said chamber adjustable between two extreme positions and having an intermediate position and having grooves therein registrable with said ports, said grooves being arranged to provide a bypass connection for said inlet and outlet ports when said rotor is in said intermediate position and selectively to connect said inlet and outlet ports with said other ports upon rotation of said rotor to one or the other extreme positions; said electrical circuit means including switch means on said control device arranged to be closed upon rotation of said rotor to one of said extreme positions; and means for rotating said rotor.

JOHN B. PARSONS.

REFERENCES CITED

The following references are of record in the file of this patent:

UNITED STATES PATENTS

| Number | Name | Date |
|---|---|---|
| 1,203,323 | Gardner | Oct. 31, 1916 |
| 1,711,565 | Hatfield et al. | May 7, 1929 |
| 1,769,534 | Nattrass | July 1, 1930 |
| 1,975,278 | Lebel | Oct. 2, 1934 |
| 2,052,182 | LeBleu | Aug. 25, 1936 |
| 2,112,466 | Maloon | Mar. 29, 1938 |
| 2,115,950 | Gurries et al. | May 3, 1938 |
| 2,139,473 | Sessions | Dec. 6, 1938 |
| 2,301,576 | Parsons et al. | Nov. 10, 1942 |
| 2,311,864 | Parsons | Feb. 23, 1943 |
| 2,511,501 | Floraday | June 13, 1950 |